June 18, 1935.  F. C. COATES  2,005,363

VOLTAGE REGULATOR

Filed Nov. 7, 1933

Inventor

Fielding C. Coates

By Lyon & Lyon
Attorneys

Patented June 18, 1935

2,005,363

UNITED STATES PATENT OFFICE 2,005,363

VOLTAGE REGULATOR

Fielding C. Coates, Los Angeles, Calif., assignor to Mole-Richardson, Inc., Los Angeles, Calif., a corporation of California Application November 7, 1933, Serial No. 696,950

2 Claims. (Cl. 290—40)

My invention relates to regulating devices, for electric generators, and has particular reference to a regulating system and apparatus for generators driven by variable speed prime movers.

In certain industries portable sources of electric power are employed to provide electric power for lighting and power purposes at points remote from a fixed power system. Particularly in the motion picture industry is it desirable that a portable source of electric power be employed upon locations which are remote from established power lines, and for this purpose it is common practice to employ a generator driven by a prime mover of the internal combustion engine type, the generator and prime mover being mounted upon a suitable truck permitting the same to be transported to the various locations at which it is desired to use the power.

With installations of this character, considerable difficulty is encountered in maintaining a constant voltage output of the generator under changes of load, due to the fact that any variation in the load on the generator is accompanied by a change in speed of the internal combustion engine, requiring that the person operating the machine be constantly alert to operate the throttle of the engine to prevent either an undesirable reduction in voltage or both an undesirable and dangerous increase in voltage.

In the motion picture industry it is necessary to provide intense lighting during the time that the scene is actually being photographed while, as soon as the cameras are stopped, there is no necessity for continuance of the intense illumination and it is therefore the common practice to instantly stop the lights as soon as photographing of the scene has ceased so that the generator sets employed for this industry are required to operate under load conditions which vary suddenly between full load and substantially no load. With such sudden reduction in load the prime mover speeds up so rapidly that the voltage exceeds the maximum voltage for lamps or other apparatus connected to the line and causes a burning out of lamps or other apparatus before it is possible for even the most alert operator to control the throttle of the prime mover.

It is, therefore, an object of this invention to provide a voltage regulating system which will automatically respond to changes in the load on the generator to prevent wide variations in voltage produced by the generator.

Another object of the invention is to provide a system for regulating the voltage output of the generator which is operable in accordance with changes in the load to maintain the voltage substantially constant under varying load conditions and to automatically control the prime mover to maintain substantially constant voltage conditions.

Another object of the invention is to provide a system of control which is responsive to changes in the load on a generator to automatically prevent the voltage output of the generator from exceeding a predetermined value.

Another object of the invention is to provide a control device for a prime mover employed for driving a generator in which the variation in the voltage output of the generator is employed for controlling the speed of the prime mover.

Other objects and advantages will be apparent from a study of the following specifications read in connection with the accompanying drawing, wherein Fig. 1 is an elevational view of a prime mover-generator assembly constructed in accordance with my invention;

Figure 1:
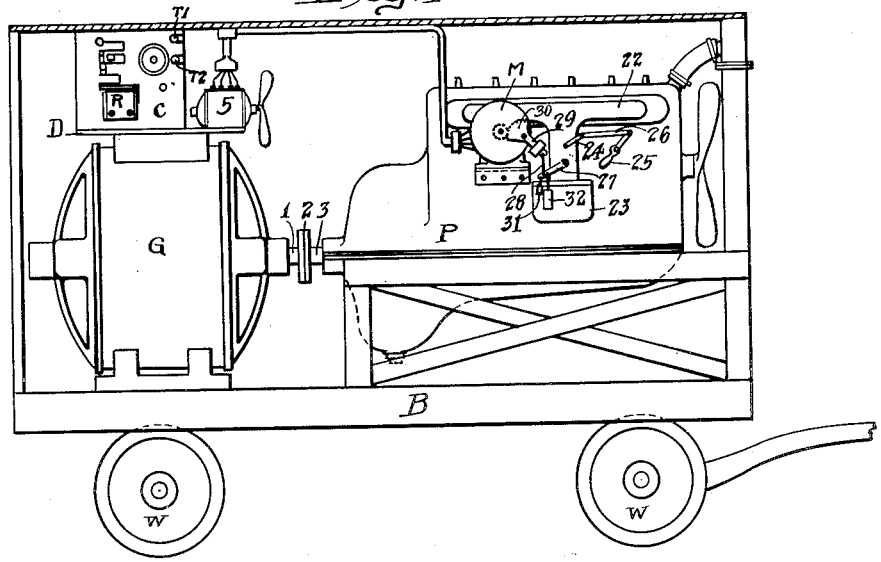

Referring to the drawing, I have illustrated in Fig. 1, a generator G, the armature shaft 1 of which is connected through a suitable coupling 2 to the crankshaft 3 of a prime mover P, illustrated in the form of an internal combustion engine of the character commonly employed in automobiles. The generator G and the prime mover are illustrated as being mounted upon a suitable base B which may be, and preferably is, equipped with a plurality of wheels W by which the power unit may be readily transported to any desired location.

A suitable control panel C is illustrated as being mounted upon the auxiliary base D, secured to the generator G, though it will be understood that the control panel may be mounted at any convenient location.

Figure 2:
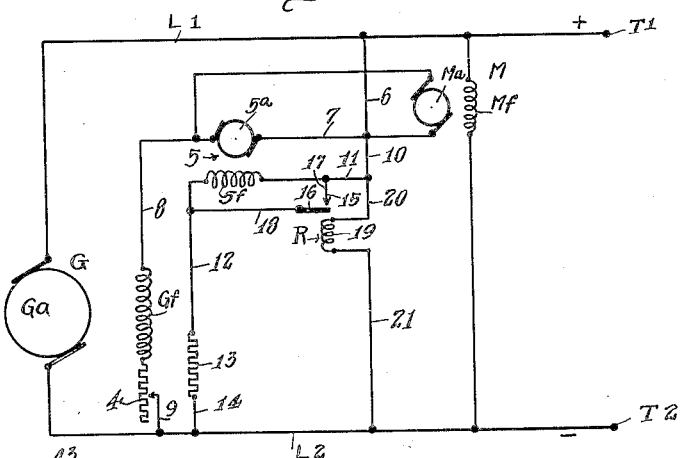
Fig. 2 is a diagrammatic view, illustrating the wiring of the generator and the control system therefor in accordance with my invention.

As will be apparent from a study of Fig. 2, the generator G is illustrated as being of the shunt-wound type, having its armature Ga connected directly to a pair of conductors L—1 and L—2, which may extend to suitable terminals T—1 and T—2, respectively, to which lamp circuits or other power circuits desired to be supplied from the generator may be connected. The field winding Gf of the generator G is illustrated as being connected across the conductors L—1 and L—2 with a suitable counter-E. M. F. regulator in series therewith, and also with a suitable field control resistance in series therewith. The control resistance is illustrated herein as comprising an adjustable resistor 4, while the counter-E. M. F. regulator is illustrated as comprising a counter-E. M. F. motor 5, the armature 5a of which is connected directly in series with the generator field winding Gf so that the circuit for the field winding Gf extends from line conductor L—1 through conductors 6 and 7, the armature 5a of the counter-E. M. F. regulator, conductor 8, field winding Gf, resistor 4 and conductor 9 to line conductor L—2.

As will be understood by those skilled in the art, the employment of a counter-E. M. F. regulator will maintain the voltage output of the generator at a substantially constant value under normal variations of load, the particular form of such regulator illustrated herein including a field winding 5f of the counter-E. M. F. motor being connected across the line conductors L—1 and L—2 by way of a circuit which extends from line conductor L—1 through conductors 6, 10 and 11, the field winding 5f, conductor 12, a ballast-resistor 13, a conductor 14, to line conductor L—2. However, for the purpose of insuring that the voltage regulation effect shall be imposed upon the generator only when the generator output voltage is near the desired normal output, the field winding 5f of the regulator is normally shunted out of circuit under the control of the voltage responsive relay R, the contacts 15 and 16 of which are connected in shunt relation with the field winding 5f by means of conductors 17 and 18.

The operating coil 19 of the relay R is illustrated as being connected directly across the line conductors L—1 and L—2 by way of a circuit which extends from line conductor L—1 and through conductors 6, 10 and 20, the coil 19 and conductor 21 to line conductor L—2.

Thus with the system thus far described, the relay R may be set to operate at voltages approaching the normal operating voltage of the generator; for example, 110-volts, so that the operation of this relay will maintain the voltage output of the generator at approximately 110-volts, irrespective of small variations in load on the generator.

As will be understood by those skilled in the art, when the voltage output of the generator approaches 110-volts, the relay R will open its contacts 15 and 16, thus causing the counter-E. M. F. motor 5 to run to supply the field winding Gf of the generator G with a counter-E. M. F. opposing the excitation voltage normally supplied to the generator field winding Gf and thus reduce the excitation of the generator field to reduce the voltage output of the generator G. In actual practice, the approach of the generator voltage output to the voltage for which the relay R is set, will cause the relay R to flutter its contacts so that the counter-E. M. F. motor 5 will operate substantially continuously to impose the necessary regulation and a state of substantial balance between the generator load, the generator voltage output, and the counter-E. M. F. will be achieved, while, if the load is reduced and the voltage output of the generator tends to increase, the counter-E. M. F. supplied by the regulator 5 will increase to hold the voltage output of the generator G at a substantially constant value.

However, when the generator G is operated by a variable speed prime mover, such as an internal combustion engine P, the reduction in load on the generator would cause the engine P to speed up, thus aggravating the condition of increased voltage output of the generator, unless the person operating the power unit exercises great diligence in controlling the throttle of the engine P. Moreover, when the power unit is employed under conditions where the load changes within wide limits, as in the motion picture industry pointed out above, the sudden change in generator load renders it almost impossible for the operator to control the throttle of the engine feed rapidly enough to prevent the generator output voltage increasing to such value as to endanger the apparatus remaining upon the line. However, the tendency for increased voltage output of the generator may be employed to automatically control the engine speed to correct the undesirable condition instantly, and prevent any damage to the apparatus which may be connected to the lines.

The automatic control is illustrated herein as including an electromagnetic device responsive to changes in the voltage output of the generator connected to automatically control the throttle of the engine P. The engine P is illustrated as being provided with the usual fuel inlet manifold 22 through which fuel is supplied to the engine from a carburetor 23.

The usual butterfly throttle valve (not shown) may be employed in the intake manifold for controlling the quantity of fuel supplied to the engine, such valve being illustrated herein as controlled by a lever 24 arranged to be set in any desired position, by means of a handle 25, connected thereto by a link 26 so that by adjusting the handle 25 to any desired position the speed of the engine may be set for any predetermined value.

An auxiliary butterfly valve (not shown) may also be interposed in the inlet manifold indicated herein as being controlled by a lever 27 connected through a link 28 to one end of an arm 29 the outer end of which is connected in any suitable manner to an electromagnetic operating device illustrated herein as a torque motor M, the armature Ma of which is geared directly to a sector gear 30 formed upon the outer end of the lever 29 so that rotation of the armature Ma will cause the throttle valve lever 27 to be moved upwardly. The arm 29 is illustrated as being normally urged downwardly by any suitable means, such as a counterweight 31 so that normally the throttle valve, controlled by the lever 27, is normally urged to open position, subjecting the engine solely to the speed control imposed by the setting of the hand-operated butterfly valve.

By referring, particularly, to Fig. 2, it will be observed that the armature Ma of the throttle motor M is connected in shunt relation with the armature 5a of the counter-E. M. F. motor 5, so that the counter-E. M. F. supplied by the motor 5 tends to rotate the armature of the throttle motor M. The field winding Mf of the throttle motor M is illustrated as being connected directly across the line conductor L—1 and L—2 so as to be normally energized.

The characteristics of the throttle motor M, and the normal setting of the throttle controlled thereby, are preferably selected so that when the generator is operating with its voltage output at the desired value, say 110-volts, the current supplied to the throttle motor armature Ma is just sufficient to balance the counterweight 31. That is, when a state of balance is achieved between the voltage output of the generator G and its regulating counter-E. M. F. motor 5, just sufficient current will be supplied to the throttle motor to balance the counterweight 31 without tending to close the throttle connected to the lever 27.

However if a great portion of the load is suddenly removed from the generator, the tendency of the voltage output of the generator to increase will cause the armature Ma of the throttle motor to be supplied with a greater current due to the increase in the counter-E. M. F. supplied by the armature 5a. Thus the arm 29 will be rotated to lift the lever 27 and automatically reduce the fuel supplied to the engine P and prevent the engine from increasing its speed, even though the hand-throttle has not been actuated. Moreover, as soon as the tendency for the voltage output of the generator rise ceases, the current supplied to the throttle motor M will be reduced and the throttle controlled thereby will be held in a position limiting the quantity of fuel supplied to the engine to that necessary to maintain the voltage output of the generator at its desired value.

If desired, a suitable dashpot 32 may be employed to prevent unduly rapid operation of the throttle lever 27 and thus prevent "hunting" of the engine P, merely allowing the throttle to move at a controlled speed necessary to achieve the desired constant voltage characteristic desired for the power apparatus.

As will be apparent to those skilled in the art, the counter-E. M. F. motor 5 may be substituted for by any other device which will act as a load on the generator field, such as a carbon-pile resistor, and the potential drop thereof may be employed for supplying the necessary current to the throttle motor. Also, it will be understood by those skilled in the art that any electromagnetic device may be substituted for the throttle motor, which device will exert a force upon the throttle lever 27 proportional to the counter-E. M. F. or to the potential drop in the E. M. F. regulator employed for the generator field.

Figure 3:
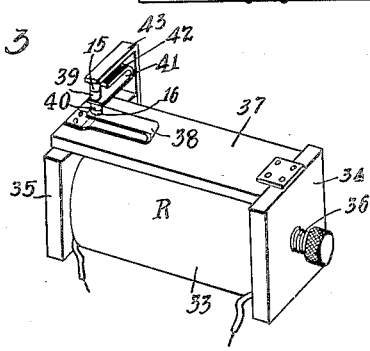
Fig. 3 is a detail, perspective view of a voltage responsive relay which may be employed in the practice of my invention.

In Fig. 3, I have illustrated a form of voltage responsive relay R which is particularly desirable for the automatic control of the voltage regulating device, such relay being illustrated as comprising a coil 33 having pole pieces 34 and 35 arranged in its magnetic circuit, preferably with a suitable adjusting device, such as a metallic screw 36 for varying the air gap in the magnetic circuit of the relay and it carries a movable contact 16 arranged to electrically engage a stationary contact 15. The movable contact 16, however, is preferably secured to the armature 37 by means of an elongated spring 38 bent back upon itself so that it may readily be affected by vibrations of the panel C upon which the relay is mounted. Also, I prefer to interpose between the contacts 15 and 16 a pair of auxiliary contacts 39 and 40 secured to an elongated spring mounting 41 insulated as indicated at 42 from the arm 43 supporting the stationary contact 15. Thus both springs 38 and 41 will be subject to vibrations of the power unit so that synchronism between the movement of the armature 37 and the fluctuations of the voltage output on the generator will be substantially impossible. By breaking up such synchronous operation, a "hunting" action between the fluctuations in voltage of the generator G and the counter-E. M. F. imposed by the motor 5 is avoided and a much smoother operation of the system is accomplished.

Also, by employing the auxilary contacts 39 and 40 any sticking of the contacts by burning will not interrupt the opening action of the counter-E. M. F. motor field circuit since if the contacts 16 and 40 should stick, the contacts 39 and 15 will open, while if the contacts 15 and 39 should stick, the contacts 16 and 40 will open.

It will, therefore, be observed that I have provided a system of automatic control for a generator actuated by a prime mover having the characteristic of varying in speed with variations in load, in which the tendency of the prime mover to change its speed is automatically prevented, and any dangerous or undesirable increase of the generator voltage is avoided.

While I have shown and described the preferred embodiment of my invention, it is to be understood that I do not wish to be limited to any of the details of construction shown herein, except as defined in the appended claims.

I claim:

1. In a regulating system for a generator driven by a prime mover, the speed of which varies inversely with the load on the generator, means for controlling the speed of said prime mover, manually operable means for said speed control means to determine the maximum desired speed of said prime mover, a counter-E. M. F. motor connected in series with the generator field across the output terminals of said generator to reduce the excitation of said generator, and means operably responsive to the counter-E. M. F. of said counter-E. M. F. motor for actuating said speed control means to reduce the speed of said prime mover when the voltage output of said generator exceeds the said predetermined value.

2. In a control system for a generator driven by a prime mover, the speed of which varies inversely with the load on said generator and having a counter-E. M. F. motor and voltage regulating relay means for maintaining the generator voltage substantially constant, the combination of a throttle for said prime mover, and electrical means responsive to the counter-E. M. F. of said regulating means for controlling the throttle to reduce the speed of said prime mover when the voltage output of said generator exceeds a predetermined value.

FIELDING C. COATES.